(12) United States Patent
Valentini

(10) Patent No.: US 7,118,609 B2
(45) Date of Patent: Oct. 10, 2006

(54) MOTORIZED TOOL WITH SUCTION AND DUST COLLECTION CAPACITY

(76) Inventor: Guido Valentini, Via Gioberti, 2, Milan I÷20123 (IT)

( * ) Notice: Subject to any disclaimer, the term of this patent is extended or adjusted under 35 U.S.C. 154(b) by 39 days.

(21) Appl. No.: 10/843,143

(22) Filed: May 11, 2004

(65) Prior Publication Data

US 2004/0226272 A1    Nov. 18, 2004

(51) Int. Cl.
B24B 23/00    (2006.01)
B24B 23/04    (2006.01)

(52) U.S. Cl. .................. 55/385.1; 55/498; 55/302; 173/71; 173/73; 451/87; 451/88; 451/270; 451/354; 451/357; 451/451; 451/453; 451/456

(58) Field of Classification Search .............. 55/385.1, 55/498, 302; 173/71, 73; 451/87, 88, 270, 451/354, 357, 451, 453, 456
See application file for complete search history.

(56) References Cited

U.S. PATENT DOCUMENTS

| 5,052,497 A | 10/1991 | Houben et al. |
| 5,113,951 A | 5/1992 | Houben et al. |
| 5,152,890 A * | 10/1992 | Linnersten .................. 210/315 |
| 5,419,737 A * | 5/1995 | Brazell et al. .............. 451/453 |
| 5,467,835 A | 11/1995 | Obermeier et al. |
| RE35,373 E | 11/1996 | Kilgrow et al. |
| 5,637,125 A * | 6/1997 | Amada ....................... 55/385.1 |
| 6,416,561 B1 * | 7/2002 | Kallsen et al. ................. 55/482 |
| 6,572,667 B1 * | 6/2003 | Greif et al. .................... 55/323 |
| 6,641,634 B1 * | 11/2003 | Reich et al. ............... 55/385.1 |
| 6,716,264 B1 * | 4/2004 | Onoda ........................ 55/385.3 |
| 6,855,040 B1 * | 2/2005 | Huber ........................ 451/357 |
| 2002/0031992 A1 * | 3/2002 | Clowers et al. ............. 451/357 |
| 2003/0143935 A1 * | 7/2003 | Huber ........................ 451/357 |

FOREIGN PATENT DOCUMENTS

| DE | 44 45 103 A1 | 5/1996 |
| JP | 09 254033 A | 9/1997 |

* cited by examiner

Primary Examiner—Duane Smith
Assistant Examiner—Minh-Chau T. Pham
(74) Attorney, Agent, or Firm—Arnold B. Silverman; Robert A. Diaz; Eckert Seamans Cherin & Mellott, LLC

(57) ABSTRACT

The present invention refers to a motorized tool with suction and dust collection capacity. The tool comprises: means for extracting dust suitable for producing a flow of air; means for collecting dust having a first duct for the entrance of the air, that can be connected separately to said tool, and at least one second duct for the air, connected to the outside environment; said means for collecting dust include a filtering element positioned between said first duct and said second duct. Said filtering element defines an internal space and an external space surrounding said internal space, one of which is in communication with said first duct and the other is in communication with said second duct.

23 Claims, 5 Drawing Sheets

MOTORIZED TOOL WITH SUCTION AND DUST COLLECTION CAPACITY

BACKGROUND OF THE INVENTION

The present invention refers to a motorized tool with suction and dust collection capacity.

Motorized tools are known, such as sanders, polishers and so on, in which an operating disk, usually called "plate", is made to orbit around the axis of a suitably controlled motor shaft.

A common problem of tools of this type is represented by the elimination of the working dusts, the majority of which are sucked through a duct that takes them outwards.

Tools having a suction system directly incorporated into the tool itself are known, where the working dust is conveyed into a special bag for filtering the air located outside the tool. These bags are removable from the tool for replacement and/or cleaning.

The patent application GB 2 343 393 describes a tool including a dust extracting system located inside its receptacle that conveys the dust into a dust collection box. The dust collection box has holes for letting out the air in the upper part of the box, transversally in relation to the direction of flow of air coming from the tool. A filter is positioned in the upper part of the box in correspondence with the holes. Once the filter is saturated it is replaced.

SUMMARY OF THE INVENTION

The object of the present invention is to provide a system for collecting the dust that is efficient and easy to clean.

In accordance with the invention this object is reached by means of a motorized tool with suction and dust collection capacity comprising: means for extracting said dust suitable for producing a flow of air; means for collecting the dust having a first duct for the entrance of the air, that can be connected separately to said tool, and at least one second duct for the air, connected to the outside environment; said means for collecting the dust include a filtering element positioned between said first duct and said second duct; characterised in that said filtering element defines an internal space and an external space surrounding said internal space.

In accordance with the invention this object is also reached by means of a dust collection receptacle comprising a first duct for the entrance of the air, and at least one second duct for the air, connected to the outside environment; said dust receptacle includes a filtering element positioned between said first duct and said second duct; characterised in that said filtering element defines an internal space and an external space surrounding said internal space.

In this manner a large filtering surface is obtained at the same time keeping the total dimensions of the filtering system limited.

In this manner it is also possible to obtain self-cleaning of the filtering element, without removing it, only by opening the closing lid.

The characteristics of the present invention will be made more evident by the following detailed description of two embodiments thereof illustrated as non-limiting examples in the enclosed drawings, in which:

DETAILED DESCRIPTION OF THE INVENTION

Figure 1:
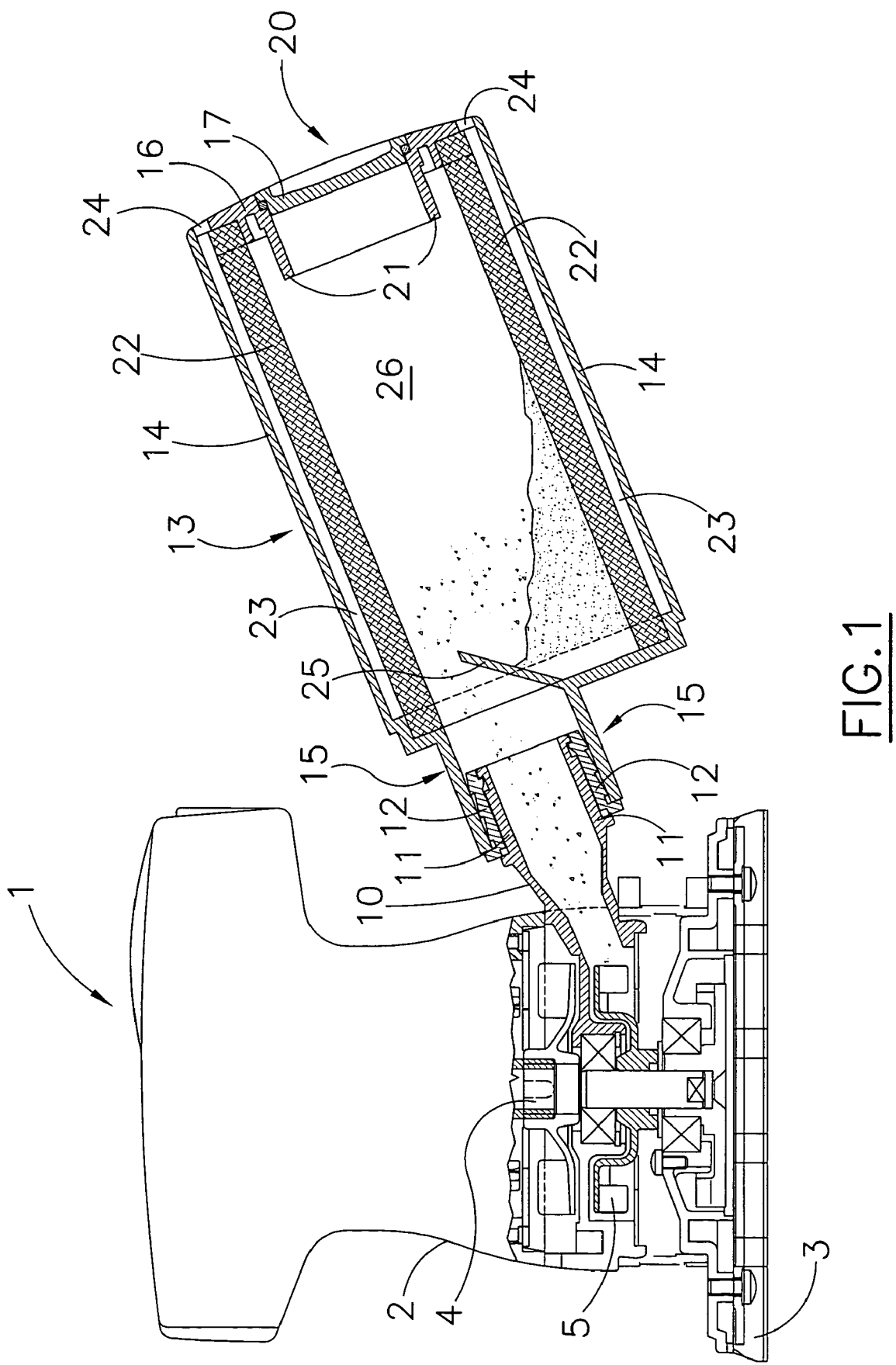
FIG. 1 shows a sectional side view of a first embodiment of the tool and of the dust collection receptacle according to the present invention.

The tool shown in FIGS. 1–4 is by way of example an orbital sander comprising a working head 1.

The working head 1 comprises a rigid external casing 2, in which a group of driving mechanisms for an operating disk or plate 3 (or alternatively a rectangular or triangular plate) is housed.

In turn the driving mechanisms comprise a motor shaft 4 that starts up a fan 5 whose job is to suck in the dust and send it towards a connection tube 10. The connection tube 10 permits the inside of the working head 1 to communicate with the outside environment. The connection tube 10 ends with an outlet 11 preferable fitted with a sealing gasket 12.

A dust collection receptacle 13 can be connected to the outlet 10. It is preferably composed of a cylindrical receptacle 14 having an outlet 15 placed at one of its ends to be able to connect to the outlet 11. The outlet 15 is eccentric in relation to the central axis of the receptacle 13. At the other end of the receptacle 13 a closing element 16 is positioned, that provides in the central part an outlet 21 with a hole or duct 20 that can be closed by means of a lid 17 connected to the closing element 16 by means of a flexible connection element 19.

A filtering cartridge 22 with a cylindrical tube shape that is preferably made of folded paper is positioned inside the receptacle 13 (FIG. 1).

The filtering cartridge 22 has a radius that is slightly lower than the radius of the receptacle 13, and the receptacle 13 is set-up in such a manner that the cartridge 22 creates an interspace 23 between the external surface of the cartridge 22 and the internal surface of the cylindrical receptacle 14. The interspace 23 thus appears tubular-shaped.

Inside the cartridge 22 there is a space 26 in which the dust is collected. The internal space 26, the cartridge 22 and the space 23 are coaxial to each other.

The cartridge 22, on the side of the outlet 15, is in contrast with the base of the receptacle 13, which in this point has a lower radius than the radius of the remaining portion, and on the other side is in contrast with the closing element 16.

The interspace 23 communicates with the outside by means of a series of openings 24 along the entire circumference in the periphery of the closing element 16.

The axis of the receptacle 13, and thus also the connection tube 10, are inclined in relation to the surface of the working level by an angle of between 0° and 45°, and preferably of about 15°.

Inside the outlet 15 towards the central part of the receptacle 13 a protuberance 25 is provided, inclined by about 45° in relation to the axis of the receptacle 13, that partially obstructs the outlet 15.

The dust collection receptacle 13 is self-supporting and is waterproof except for the duct 15, the openings 24 and the duct 20 when the lid 17 is open.

Figure 2:
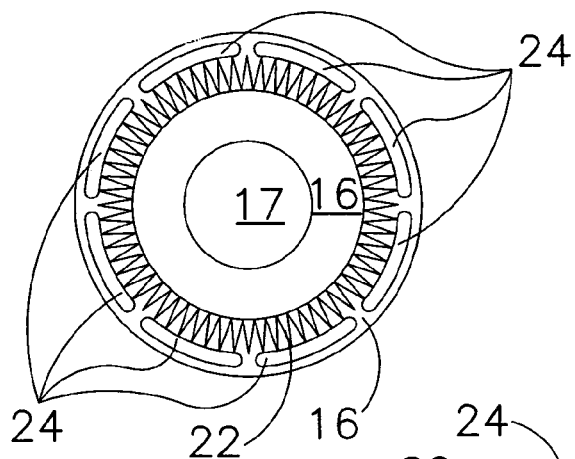
FIG. 2 shows a front view of the dust collection receptacle of FIG. 1.
Figure 3:
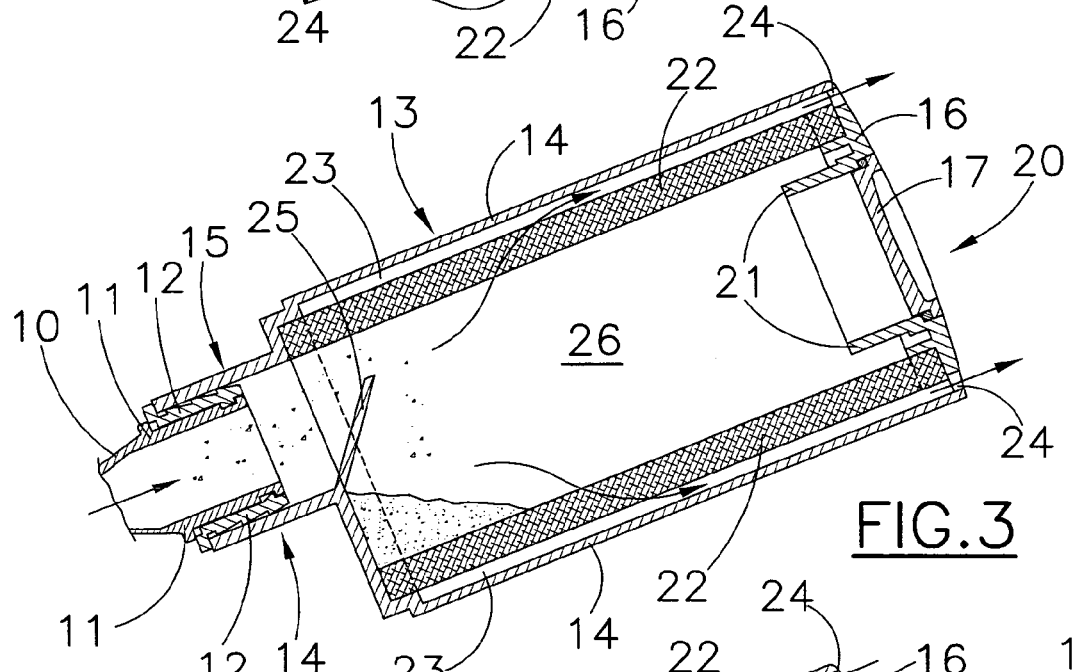
FIG. 3 shows a sectional side view of the dust collection receptacle of FIG. 1, with the lid closed.
Figure 4:
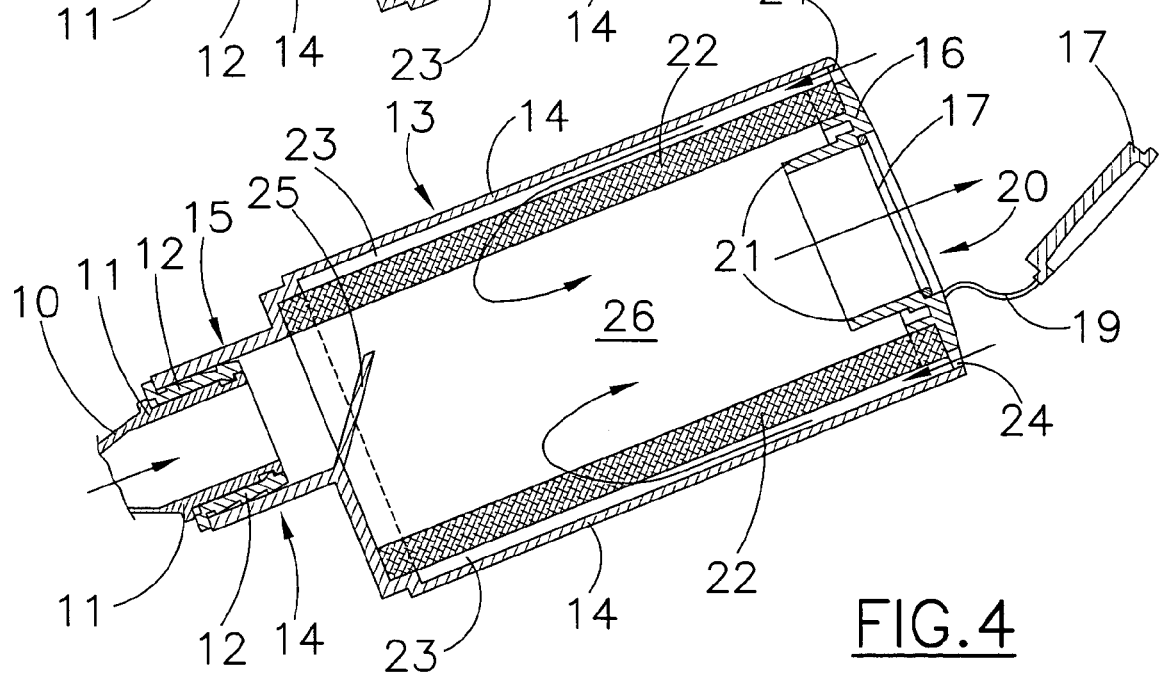
FIG. 4 shows a sectional side view of the dust collection receptacle of FIG. 1, with the lid open.
Figure 5:
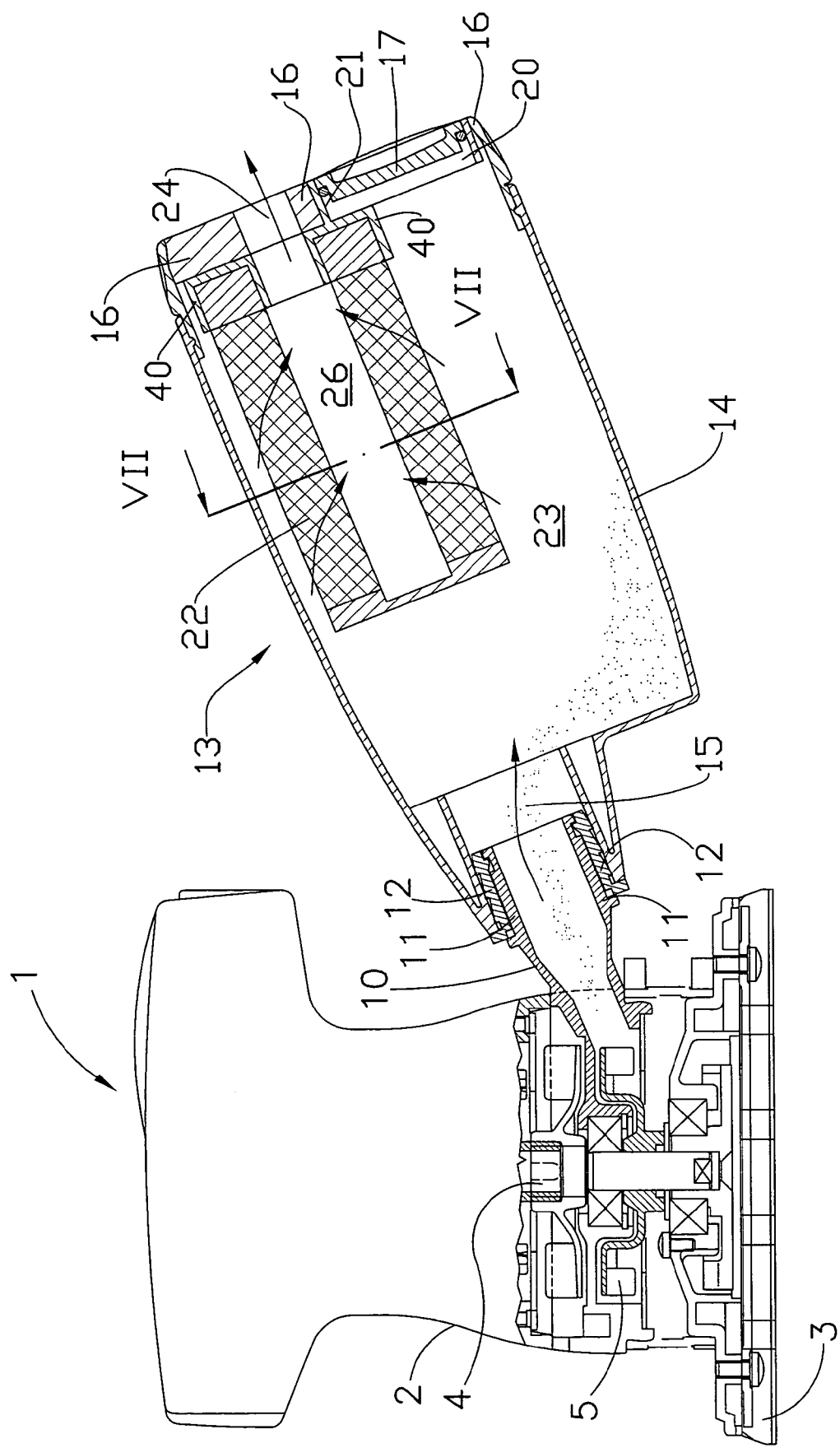
FIG. 5 shows a sectional side view of a second embodiment of the tool and of the dust collection receptacle.
Figure 6:
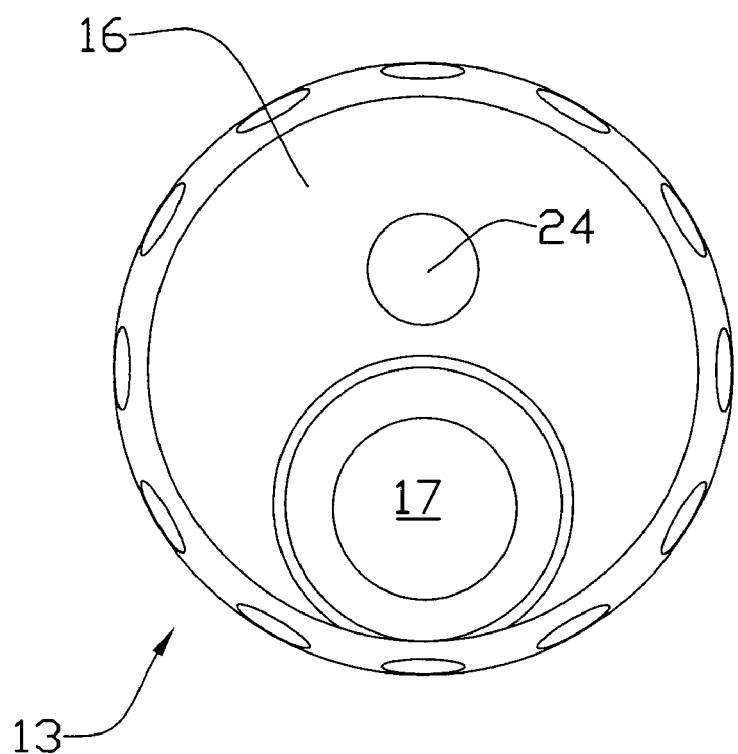
FIG. 6 shows a view from the right of the receptacle of FIG. 5.
Figure 7:
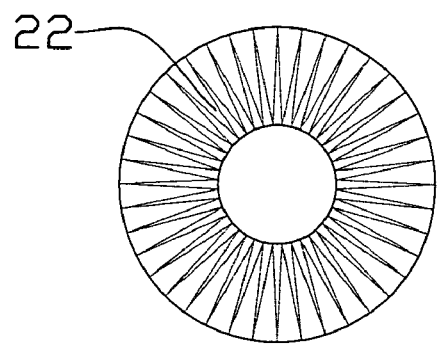
FIG. 7 shows a sectional view according to the line VII—VII of FIG. 5.
Figure 8:
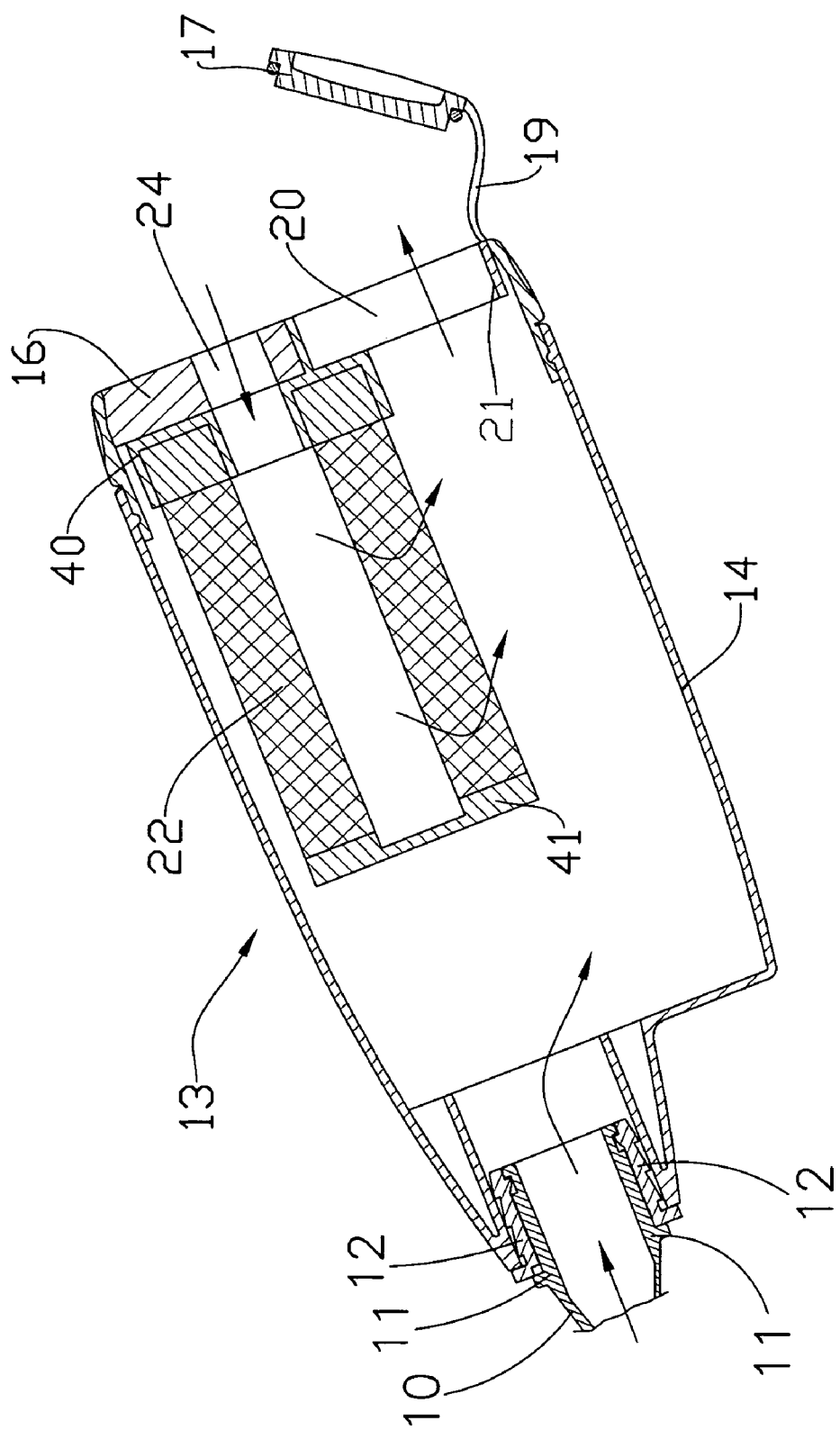
FIG. 8 shows a sectional side view of the dust collection receptacle of FIG. 5, with the lid open.

The dust collection receptacle is shown in FIG. 2, seen from the front, where the openings 24 placed on the closing element 16 can be seen. The filtering cartridge 22 with its folding can also be seen.

In regard to the operation, when the tool 1 is operating, the fan 5 also moves generating a flow of air that collects the working dust and conveys it through the connection tube 10 towards the receptacle 13. In this case the lid 17 is closed. The protuberance 25 (FIGS. 1 and 3) is preset in such a manner that the dust can enter the receptacle 13 (space 26) but obstructs its exit, that is, the return towards the tool 1, in particular when it is not working. The inclination of the receptacle 13 in relation to the working level and the eccentricity of the outlet 15 also favours this action. Therefore the dust is deposited inside the space 26 and the air passes through the filtering cartridge 22 and leaves the receptacle 13 through the openings 24. The flow of air in this case is shown by the arrows in FIG. 3.

For cleaning the receptacle 13, the lid 17 is opened and the tool 1 is kept working. The flow of air generated by the fan 5 pushes the dust towards the duct 20 and then towards the outside of the receptacle 13. This flow of air advantageously creates a counter-flow that enables the filtering cartridge 22 to be cleaned. In fact, the flow of air coming from the fan 5 and passing through the ducts 15 and 20 creates a vacuum that attracts the air from the openings 24 towards the inside of the receptacle 13 (space 26), making it pass through the filtering cartridge 22, as can be seen from the arrows of FIG. 4.

In this manner there is a self-cleaning of the filtering cartridge without having to remove it, and thus it can be used again without having to be replaced.

The outlet 21 permits the insertion of a suction device for further cleaning if needed without having to remove the filtering cartridge. The advantage lies in the fact that the suction power can be easily increased and at the same time a real washing of the filter can be created. This operation regenerates the filter so that its life is lengthened and its filtering effectiveness is kept constant.

Should the filtering cartridge 22 need to be replaced the closing element 16 is removed and the cartridge is replaced.

The receptacle 13 has been described as being circular-shaped, but it can be of any other shape for example in the shape of a parallelepiped. The same also goes for the filtering cartridge 22.

The openings 24 can also be placed on the side walls of the receptacle 13.

In a second embodiment (FIGS. 5–8) of the tool and of the receptacle according to the present invention, the filtering cartridge 22 is still a tubular-cylindrical shape and is inside the casing 13, the two axes no longer being coincident but simply parallel. One of its ends is bound to the closing elements 16 by means of supports 40 while the other end is closed by a lid 41.

Also in this case the arrangement of the cartridge 22 determines an internal space 26 being formed, now in communication with the second duct 24, and an external space 23, no longer a simple interspace, that communicates with the outside by means of the third duct 20.

In this embodiment, with the lid 17 closed and the fan 5 operating, the dust enters and accumulates in the external space 23 while in the internal space 26 only clean air enters that comes out of the hole 24.

For cleaning the receptacle, once the fan 5 has stopped, the lid 17 is opened and the hole 20 is connected to a suction device. The dust collected in the external space 23 is thus taken away from the receptacle 13 and at the same time a counter-flow of air is created that enters through the hole 24 and passes through filtering cartridge 22, carrying out the cleaning.

The invention claimed is:

1. A motorized tool with suction and dust collection capacity comprising:
   means for extracting dust suitable for producing a flow of air;
   means for collecting dust having a first duct for the entrance of the air, that can be connected separately to said tool, an at least one second duct for the air, connected to an outside environment;
   said means for collecting dust includes a filtering element positioned inside an external casing with a tubular shape, characterised in that said filtering element defines an internal space and an external space surrounding said internal space; and
   said means for collecting dust also includes a third duct having a lid that can be positioned between a first closed position and a second open position that puts said means for collecting dust in communication with the outside environment;
   when said lid is positioned in said first closed position said flow of air enters from said first duct and goes out from said second duct;
   when said lid is positioned in said second open position said flow of air enters from said first duct and goes out from said third duct and another flow of air is created and enters from said second duct and goes out from said third duct.

2. Tool in accordance with claim 1, wherein said internal space and said external space are coaxial to each other.

3. Tool in accordance with claim 1, wherein said internal space and said external space have axes that are parallel to each other.

4. Tool in accordance with claim 1, wherein said third duct puts said internal space in communication with the outside environment.

5. Tool in accordance with claim 1, wherein said third duct puts said external space in communication with the outside environment.

6. Tool in accordance with claim 1, wherein said means for collecting dust have a cylindrical shape and said first duct is eccentric in relation to the axis of said cylinder.

7. Tool in accordance with claim 1, wherein said means for collecting dust are inclined in relation to the working surface.

8. Tool in accordance with claim 1, wherein said first duct comprises a protuberance that partially obstructs said first duct so as to favour the entrance of the dust in said collecting means and to obstacle it from going out.

9. Tool in accordance with claim 6, wherein said second duct is positioned on a first base of said cylinder in opposition to said first duct positioned on a second base of said cylinder.

10. Tool in accordance with the claim 9, wherein said third duct is positioned on said first base of said cylinder in opposition with said first duct positioned on a second base of said cylinder.

11. A dust collection receptacle comprising:
    a first duct for the entrance of the air, and at least one second duct for the air, connected to an outside environment;

said receptacle of the dust includes a filtering element positioned inside an external tubular-shaped casing, characterised in that said filtering element defines an internal space and an external space surrounding said internal space; and a third duct having a lid that can be positioned between a first closed position and a second open position that puts said first duct into communication with the outside environment;

when said lid is positioned in said first closed position said flow of air enters from said first duct and comes out from said second duct;

when said lid is positioned in said second open position said flow of air enters from said first duct and comes out from said third duct and another flow of air is created and enters front said second duct and comes out from said third duct.

12. Tool in accordance with claim 1, wherein said filtering element has a cylinder shape without the two bases, said internal space communicates with said first duct and said external space communicates with said second duct.

13. Tool in accordance with claim 1, wherein said third duct is positioned on a removable closing element of said means for collecting dust.

14. Receptacle in accordance with claim 11, wherein said internal space and said external space are coaxial to each other.

15. Receptacle in accordance with claim 11, wherein said internal space and said external space have parallel axes with each other.

16. Receptacle in accordance with claim 11, wherein said dust collection receptacle has an external cylindrically-shaped casing and said first duct is eccentric in relation to the axis of said cylinder.

17. Receptacle in accordance with claim 11, wherein said first duct comprises a protuberance that partially obstructs said first duct so as to favour the entrance of the dust in the receptacle and obstacle it from coming out.

18. Receptacle in accordance with claim 11, wherein said second duct is positioned on a first base of said cylinder in opposition to said first duct placed on a second base of said cylinder.

19. Receptacle in accordance with claim 11, wherein said third duct is positioned on a first base of said cylinder in opposition to said first duct placed on a second base of said cylinder.

20. Receptacle in accordance with claim 11, wherein said filtering element has a cylindrical tube shape open at the ends.

21. Receptacle in accordance with claim 11, that wherein said internal space communicates with said first duct and said external space communicates with said second duct.

22. Receptacle in accordance with claim 11 wherein said internal space communicates with said second duct and said external space communicates with said first duct.

23. Receptacle in accordance with claim 11, wherein said third duct is positioned on a removable closing element.

* * * * *